United States Patent [19]

Dressnandt et al.

[11] 4,026,853
[45] May 31, 1977

[54] CURABLE BITUMINOUS ORGANOPOLYSILOXANE COMPOSITIONS

[75] Inventors: Günter Dressnandt; Hermann Meyer, both of Munich; Walter Keil, Planegg; Oswin Sommer, Burghausen; Klaus Marquardt, Krailling; Franz Heinrich Kreuzer, Munich; Eckhart Louis, Burghausen, all of Germany

[73] Assignee: Consortium fur Elektrochemische Industrie GmbH, Munich, Germany

[22] Filed: Nov. 19, 1975

[21] Appl. No.: 633,196

[30] Foreign Application Priority Data

Nov. 20, 1974 Germany .......................... 2455004

[52] U.S. Cl. .................... 260/28.5 AS; 260/18 S; 260/28 R; 260/37 SB; 260/46.5 G; 260/825; 260/827

[51] Int. Cl.$^2$ ......................................... C08L 91/00

[58] Field of Search .......... 260/28 R, 28.5 AS, 827, 260/375 B, 825, 18 S

[56] References Cited

UNITED STATES PATENTS

| | | | |
|---|---|---|---|
| 3,560,244 | 2/1971 | Neuroth | 260/827 |
| 3,897,380 | 7/1975 | Walaschek | 260/28.5 AS |

*Primary Examiner*—Melvyn I. Marquis

[57] ABSTRACT

Bituminous organopolysiloxanes which are capable of being cured comprising a bituminous material and a modified organopolysiloxane capable of being crosslinked.

39 Claims, No Drawings

CURABLE BITUMINOUS ORGANOPOLYSILOXANE COMPOSITIONS

The present invention relates to bituminous compositions and more particularily to bituminous compositions containing organopolysiloxanes which are capable of being cross-linked.

Bituminous compositions containing organic polymers have been produced in order to extend the organic polymers or in order to obtain bituminous compositions having particular physical properties, such as an extended plasticity range (cf. German Auslegeschrift No. 2 018 760). Organic polymers that have been used in such compositions include vinyl polymers, divinyl polymers, epoxy resins, and polyalkylsulphides. Compositions containing methylpolysiloxanes mixed with asphalt or pitch have also been produced (cf. U.S. Pat. Spec. No. 2,258,218 and French Patent Specification No. 867 507). However, when methylpolysiloxanes are mixed with bitumen or tar to give cross-linkable bituminous compositions, the mixtures ultimately separate into two phases after standing for only a short period of time.

Therefore, it is an object of this invention to produce bituminous compositions containing organopolysiloxanes which are capable of being cross-linked. Another object of this invention is to produce bituminous compositions which are capable of being cured to an elastomeric solid. A further object of this invention is to produce homogeneous bituminous-organopolysiloxane compositions which do not separate after standing for a period of time. A still further object of this invention is to provide bituminous compositions having a lower modulus and lower compression set than nonbituminous compositions.

The foregoing objects and others which will become apparent from the following description are accomplished in accordance with this invention, generally speaking, by providing a bituminous composition containing a bituminous material and from about 0.5 to about 95 percent by weight based on the total weight of the composition of a modified organopolysiloxane capable of being cross-linked.

Unlike the previously-mentioned bituminous compositions containing organopolysiloxanes, the compositions of this invention do not separate even on storage for long periods of time. Consequently, these compositions can be more easily prepared than the previously mentioned compositions. Moreover, the cured products prepared from the compositions of this invention have a lower modulus of elasticity and a lower compression set than do nonbituminous compositions containing cross-linkable modified diorganopolysiloxanes.

The term "bituminous compositions", as used herein refers to compositions containing a bituminous material. The term "bituminous material" as used herein includes not only bitumen itself, but also tar, pitch and the like. Substances such as tar, pitch and the like may be used individually or in admixture with one another or in admixture with bitumen even though bitumen is the preferred bituminous material.

According to H. Rompp, *Chemie Lexikon* 6th edition, Stuttgart 1966, column 702, bitumen is a dark-colored, semi-solid to brittle, fusible, high-molecular-weight hydrocarbon mixture obtained from the preparation of mineral oils, and the fractions of natural asphalt soluble in carbon disulphide. There are various classes and types of bitumen encompassed by the broad term "bitumen". There is, for example, primary bitumen, which includes, for example, bitumen types B 300, B 200, B 80, B 65, B 45, B 25, and B 15; high-vacuum bitumen, which includes, for example, bitumen types HVB 85/95, HVB 95/105, and HVB 130/140; blown bitumen, which includes, for example, bitumen types 75/30, 85/40, 105/15, 115/15, and 135/10; and bitumen-blends, which are mixtures of bitumen and oils such as tar oil, including, for example, bitumen types VB 100 and VB 500. All these types of bitumen may be used in the present invention.

The broad term "tar" encompasses, for example, coal tar, lignite tar, wood tar, and peat tar, all of which may be used as bituminous materials in this invention. Pitch is the distillation residue of tar, and may be obtained, for example from any of the above-mention tars.

The amount of bituminous material in the bituminous compositions of this invention is preferably from about 5 to 60 percent by weight, based on the total weight of the composition.

The term "modified diorganopolysiloxane" as used herein refers to a graft copolymer or block copolymer in which one or more diorganopolysiloxane chain(s) is or are chemically bonded to one or more organic polymer chain(s). The term "organic polymer" as used herein does not include organosilicon polymers such as organopolysiloxanes. Modified diorganopolysiloxanes that are graft copolymers consist of a main chain (or "backbone") that is a diorganopolysiloxane chain, and one or more organic polymer chains as side chains. Modified diorganopolysiloxanes that are block copolymers consist of a chain or chains each consisting of alternate diorganopolysiloxane blocks or segments and organic polymer blocks or segments. The chemical bond linking a diorganopolysiloxane chain and an organic polymer chain usually involves an —Si—C— grouping or an —Si—O—C— grouping.

The organic polymers used in the modified diorganopolysiloxanes may be various types of polymerization products including polycondensation and polyaddition products. Examples of suitable organic polymers are polyesters, polyethers, polyurethanes, and polymers from olefinically unsaturated monomers. Advantageously, each organic polymer chain, that is each organic side chain or each organic segment as the case may be, contains at least 10 carbon atoms.

Modified diorganopolysiloxanes and their preparation have previously been described many times. They are described, for example, in German Offenlegungsschriften Nos. 1,595,531, 2,038,519, and 2,116,837, USSR Certificate of Authorship No. 222 664, U.S. Pats. Nos. 2,965,593, 3,555,109, 3,627,836, 3,631,087, and 3,776,875, and British Pat. No. 1,261,484.

The proportion of the modified diorganopolysiloxane consisting of diorganopolysiloxane chain(s) is preferably from about 1 to about 95 percent by weight, and the proportion consisting of organic polymer chain(s) is preferably from about 99 to about 5 percent by weight, based on the total weight of the modified diorganopolysiloxane.

Modified diorganopolysiloxanes used in this invention may be represented by the general formula

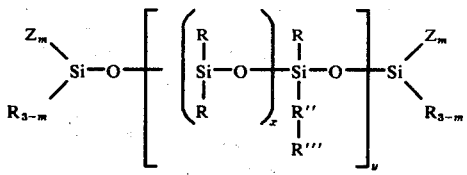

wherein R which may be the same or different represents a monovalent unsubstituted or substituted hydrocarbon radical, R" which may be the same or different represents a bivalent unsubstituted or substituted hydrocarbon radical, R''' which may be the same or different represents a monovalent organic polymeric radical, which is bonded to R" preferably via a carbon-carbon bond, Z represents a hydrolyzable group, or a hydroxy group, $m$ represents 0, 1, 2 or 3, $x$ represents zero or a positive integer, and $y$ represents a positive integer up to 500.

The monovalent hydrocarbon radicals represented by R preferably have up to about 7 carbon atoms. Examples of unsubstituted monovalent hydrocarbon radicals are alkyl radicals, e.g. methyl, ethyl, propyl, butyl, and hexyl radicals; cycloalkyl radicals, e.g. cyclohexyl radicals; aryl radicals, e.g. phenyl radicals; and alkaryl radicals, e.g. tolyl radicals. Examples of substituted monovalent hydrocarbon radicals are advantageously halohydrocarbon radicals, e.g. 3,3,3-trifluoroprophyl and chlorophenyl radicals; and cyanoalkyl radicals; e.g. α-cyanoethyl radicals. Preferably at least 90 percent of the radicals represented by R are methyl radicals, because methylpolysiloxanes are more readily available.

The bivalent hydrocarbon radicals represented by R" also preferably have up to 7 carbon atoms. Although methylene radicals are the preferred bivalent hydrocarbon radicals, other radicals such as ethylene, trimethylene, tetramethylene, hexamethylene, and cyanoethylene radicals may be employed.

The organic polymeric radicals represented by R''' preferably consist of recurring units derived from olefinically unsaturated monomers. Examples of such monomers are olefins, e.g. ethylene, propylene, and butylene; vinyl halides, e.g. vinyl fluoride and vinyl chloride; vinyl esters of organic acids, e.g. vinyl acetate; vinyl aryl compounds, e.g. styrene, substituted styrenes, and vinylnaphthalene; vinyl aromatic heterocyclic compounds, e.g. vinylpyridine; acrylic acid and derivatives thereof, such as salts, esters and amides thereof and acrylonitrile; N-vinyl compounds, e.g. N-vinylcarbazole, N-vinylpyrrolidone, and N-vinylcaprolactam; vinylsilanes, e.g. vinyltriethoxysilane; symmetrically disubstituted ethylenes, e.g. vinylene carbonate; asymmetrically disubstituted ethylenes, e.g. vinylidene fluoride, vinylidene chloride, vinylidene cyanide, and methacrylic acid and derivatives thereof, e.g. salts, esters, and amides thereof, methacrylonitrile, and methacrolein.

These monomers may be used alone, for example methacrylic acid may be used as the sole monomer. Likewise, a mixture containing two or more of these monomers may be used, for example, a mixture of styrene and n-butyl acrylate or a mixture of an acrylate and an acrylonitrile. In the latter mixture, one of the monomers may be substituted, for example, as in a mixture of ethyl acrylate and methacrylonitrile, or both monomers may be substituted, for example, as a mixture of n-butyl methacrylate and methacrylonitrile. A further alternative is to use a mixture of one or more of these monomers and one or more other copolymerizable monomers, e.g. maleic acid anhydride, maleic acid esters, fumaric acid esters, stilbene, indene, and coumarone.

The hydrolyzable groups represented by Z may suitably be those hydrolyzable atoms and groups which are present in hydrolyzable silicon compounds conventionally used for the preparation of curable organopolysiloxane compositions that are curable at room temperature in the presence of water to form elastomers. Examples of such hydrolyzable groups are acyloxy groups (—OOCR'), unsubstituted or substituted hydrocarbonoxy groups (—OR ), hydrocarbonoxy-hydrocarbonoxy groups (—OR"OR'), amino groups and substituted amino groups (—NR'$_2$), aminoxy groups (–ONR'$_2$), acylamino groups [NR(COR')], oxime groups (ON=CR'$_2$), and phosphate groups [—OP(=O)-(OR')$_2$], in which R and R" are the same as above, and R' represents a hydrogen atom or a monovalent unsubstituted or substituted hydrocarbon radical. The previously given examples of monovalent hydrocarbon radicals represented by R apply equally as well to the monovalent hydrocarbon radicals represented by R'.

Preferred acyloxy groups (—OOCR') are those having no more than about 18 carbon atoms, for example, formyloxy, acetoxy, propionyloxy, valeryloxy, caproyloxy, myristoyloxy, and stearoyloxy groups.

Examples of suitable hydrocarbonoxy groups (—OR) are alkoxy groups having no more than 10 carbon atoms, for example, methoxy, ethoxy, n-propoxy, isopropoxy, butoxy, hexyloxy, heptyloxy, and octyloxy groups. Examples of other hydrocarbonoxy groups having up to 10 carbon atoms are vinyloxy, allyloxy, ethylallyloxy, isopropenyloxy, butadienyloxy, and phenoxy groups. An example of a hydrocarbonoxyhydrocarbonoxy group (OR"OR') is a methoxyethoxy group.

Examples of aminoxy groups (—ONR'$_2$) are dimethylaminoxy, diethylaminoxy, dipropylaminoxy, dibutylaminoxy, dioctylaminoxy, diphenylaminoxy, ethylmethylaminoxy, and methylphenylaminoxy groups. Examples of substituted amino groups (—NRR') are n-butylamino, secbutylamino, and cyclohexylamino groups. An example of an acylamino group [—NR(COR')] is a benzoylmethylamino group.

Examples of oximo groups (—ON=CR'$_2$) are acetophenonoxime, acetonoxime, benzophenonoxime, 2-butanonoxime, diisopropylketoxime and chlorocyclohexanonoxime groups. Examples of phosphate groups [—OP(=O)(OR')$_2$] are dimethylphosphate, diethylphosphate, dibutylphosphate, dioctylphosphate, methylethylphosphate, methylphenylphosphate, and diphenylphosphate groups.

Examples of hydrolyzable atoms represented by Z are halogen atoms, especially chlorine atoms, and hydrogen atoms.

Preferably, Z represents a hydroxy group. Moreover, $m$ preferably represents 1, so that there is one hydrolyzable atom or group or one hydroxy group bonded to each terminal silicon atom.

Usually, $x$ is determined primarily by the fact that the bituminous compositions containing these modified diorganopolysiloxanes should be capable of flow, optionally when admixed with solvents, at a temperature below their decomposition temperature.

By the modified diorganopolysiloxane being "substantially" of the general formula given above, it is meant that there may be small amounts of siloxane units other than diorganoxiloxane units present within the siloxane chain. Such other units are often present only as impurities and not usually in amounts exceeding about 10 mole percent. Preferably such units should be present in such amounts that the ratio of the number of organic radicals, i.e., the sum of the number of radicals represented by R, R'' and R''' to the number of silicon atoms is within the range of from 1.9:1 to 2.25:1. Moreover, in addition to the diorganosiloxane units and diorganosiloxane units of the formulae —Si(R)$_2$-O— and —(R)Si(R''R''')-O—, there may be present a small number of diorganosiloxane units of the formula —Si(R''R''')$_2$-O—. Moreover, a small number of terminal units may contain at least one radical of the formula —R''-R''' instead of a radical of the formula —R. It is also possible for a small number of the organic polymeric radicals to be bivalent.

The modified diorganopolysiloxanes used in accordance with this invention are preferably prepared by the free-radical graft polymerization of olefinically unsaturated monomers onto diorganopolysiloxanes. This is preferably effected by grafting an olefinically unsaturated monomer onto a diorganopolysiloxane by means of a free-radical initiator in the presence of from 1 to 50 percent by weight, based on the weight of the polymerization components, of a liquid that is a non-solvent under the polymerization conditions for both the initial and modified diorganopolysiloxanes, i.e., inert toward the polymerization components, and has a boiling point of not more than 100° C at 760 mm Hg. An example of such a liquid is water.

The products obtained from the graft polymerization after removal of the unreacted olefinically unsaturated monomers and if appropriate, the inert liquid, contain not only the graft modified diorganopolysiloxanes, but also unreacted (unmodified) diorganopolysiloxanes and homopolymers and copolymers of the olefinically unsaturated monomers. These products may, for example, be in the form of rod-like or thread-like solid polymers embedded in the liquid polymer. The resultant mixture should be considered as the "modified diorganopolysiloxane" in calculating the relevant percentages of the materials employed in this invention. This product mixture can be mixed with the bituminous materials in accordance with this invention.

The bituminous compositions of this invention preferably contain modified diorganopolysiloxanes in an amount from about 0.5 to 70 percent by weight based on the total weight of the composition. They may contain only one type of modified diorganopolysiloxane or they may contain a mixture of two or more modified diorganopolysiloxanes.

These bituminous compositions may be prepared by mixing the modified diorganopolysiloxane, with agitation, in a mixing vessel equipped with a stirrer, at a temperature within the range of from about room temperature up to about 150° C, with the bituminous material which has previously been liquified by heating, and thereafter continuing to agitate until the mixture becomes homogeneous.

The bituminous compositions of this invention may also contain substances in addition to the bituminous material and the modified diorganopolysiloxane. They may, for example, contain crosslinkable unmodified diorganopolysiloxanes, especially those having in their terminal units an Si-bonded hydroxy group or a hydrolyzable group, cross-linking agents, condensation catalysts, and other substances conventionally used in diorganopolysiloxane compositions which cross-link to form elastomeric solids.

Unmodified diorganopolysiloxanes which may be present in the compositions, including any unreacted diorganopolysiloxane used in the preparation of the modified diorganopolysiloxanes, may be represented by the general formula

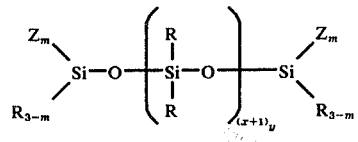

in which R, Z, $m$, $x$ and $y$ are the same as above. Examples of radicals represented by R and Z are the same as those described heretofore. Examples of other R radicals are alkenyl radicals, e.g. vinyl, allyl, ethylallyl, and butadienyl radicals, and cycloalkenyl radicals, e.g. cyclohexenyl radicals. Small amounts of siloxane units other than diorganosiloxane units may be present within the siloxane chain; however, such other units are present only as impurities and not usually in amounts exceeding about 10 mole percent. The ratio of organic radicals to silicon atoms in the unmodified diorganopolysiloxanes is generally within the range of from about 1.9:1 to 2.25:1.

The amount of unmodified diorganopolysiloxanes used in the compositions of this invention are generally not more than 70 percent by weight and more preferably not more than about 50 percent by weight based on the weight of modified diorganopolysiloxanes. This amount is in addition to any unreacted diorganopolysiloxanes remaining after the preparation of the modified diorganopolysiloxanes. By varying the amount and viscosity of the unmodified diorganopolysiloxane it is possible to control the viscosity of the bituminous composition as desired. In the preparation of compositions containing unmodified diorganopolysiloxanes, it is preferred that the unmodified diorganopolysiloxane be first mixed with the modified diorganopolysiloxane, and the resultant composition is then mixed with the bituminous material.

Other substances which may be present in the composition of this invention are fillers, pigments, stabilizers, antioxidants, ultra-violet-light absorbers, plasticizers e.g. dioctyl phthalate, and trimethylsiloxy-terminated dimethylpolysiloxanes which are liquid at room temperature and cell-producing agents, such as azodicarbonamide.

Fillers which may be employed include both reinforcing and non-reinforcing fillers. Reinforcing fillers are those having a surface area of at least 50 m$^2$/g, and non-reinforcing fillers are those having a surface area below 50 m$^2$/g. Examples of suitable reinforcing fillers are precipitated silicon dioxide having a surface area of at least 50 m$^2$/g and pyrogenically produced silicon dioxide. Examples of non-reinforcing fillers are diatomaceous earths, bentonites, quartz powder, titanium dioxide (pigment grade), ferric oxide and zinc oxide. Fibrous fillers, such as asbestos and glass fibres, may also be used. The fillers may have been previously treated with, for example, trimethylethoxysilane in a ball mill, so that they have organosiloxy groups on their surface. The fillers are advantageously used in amounts of up to about 50 percent by weight, based on the total weight of the bituminous composition.

The amount of pigment, if any, employed in the composition of this invention is from about 1 to 30 percent by weight and more preferably from about 3 to 10 percent by weight based on the total weight of the composition. Even the presence of a relatively small amount of a white pigment such as titanium dioxide, can render the composition a pale color.

Plasticizers are suitably used in amounts of up to about 20 percent by weight based on the total weight of the composition.

The manner in which the compositions are cross-linked depends on the terminal groups that are present on the modified diorganopolysiloxanes and unmodified diorganopolysiloxane, if present. If the modified diorganopolysiloxanes and unmodified diorganopolysiloxanes contain at least three hydrolyzable groups per molecule, then the compositions can be stored in the absence of water, but will cross-link when exposed to water. Atmospheric moisture is usually sufficient to cause cross-linking of these compositions.

If the modified diorganopolysiloxanes and unmodified diorganopolysiloxanes, if present, contain at least two Si-bonded hydroxy groups per molecule, then the compositions can be crosslinked by means of cross-linking agents containing at least three condensable groups per molecule, and optionally, condensation catalysts. These may be in the form of either "one-component systems" or "two-component systems".

In the one-component systems, the ingredients can be mixed together in the absence of water, but will cure to an elastomeric solid merely by exposing the compositions to atmospheric moisture. These systems generally contain a modified diorganopolysiloxane and, optionally, an unmodified diorganopolysiloxane, each having at least two Si-bonded hydroxy groups per molecule, a polyfunctional silicon compound containing at least three groups hydrolyzable by atmospheric moisture per molecule and, optionally, a condensation catalyst.

Examples of suitable polyfunctional silicon compounds which may be used as cross-linking agents in the one-component systems are methyltriacetoxysilane, tetraacetoxysilane, methyltert-butoxy-acetoxy silicon compounds having a total of at least three tert-butoxy and acetoxy groups per molecule, methyltris(cyclohexylamino)silane, n-propyltriacetoxysilane, isopropyltriacetoxysilane, methyl-tris-(sec-butylamino)silane, isopropoxytriacetoxysilane, methyl-tri-2-butanonoximosilane, methyltris(diethylaminoxy(silane, methyl-tris(diethylphosphate) silane and methyltris(isopropylamino)silane.

In the two-component systems, the composition will cure immediately to an elastomeric solid after the cross-linking agent and the condensation catalyst, if used, is mixed with the diorganopolysiloxane(s). Therefore, the composition must be shaped immediately after mixing the various ingredients together. If the composition is not going to be used immediately after mixing, then it is necessary to keep the cross-linking agent separate from the diorganopolysiloxane(s) until immediately prior to use. These systems generally comprise a modified diorganopolysiloxane and, optionally, an unmodified diorganopolysiloxane, each containing at least two Si-bonded hydroxy groups per molecule, a cross-linking agent that is either a silane of the general formula

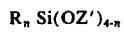

in which R is the same as above, Z' represents a monovalent hydrocarbon radical or an oxyhydrocarbon radical, and $n$ represents O or 1, or a siloxane that is liquid at room temperature, which contains at least three Si-bonded hydrogen atoms and/or groups of the formula —OR' per molecule, and in which any silicon valencies not satisfied by a hydrogen atom, a siloxane oxygen atom, or an —OR' group, are satisfied by radicals represented by R and, optionally, a condensation catalyst.

Examples of cross-linking agents which may be used in the two-component systems are methyltriethoxysilane, tetraethoxysilane, "ethyl silicate 40" (an ethyl polysilicate having an $SiO_2$ content of about 40 percent), isopropyl polysilicates, n-butyl polysilicates, methylbutoxydiethoxysilane, dimethyltetraethoxydisiloxane, hexaethoxydisiloxane, methyl-tris(methoxyethoxy)silane, and methylhydrogenopolysiloxanes.

Both in the one-component systems and in the two-component systems, the polyfunctional silicon compounds, that is the cross-linking agents, are preferably used in amounts of from about 0.5 to about 20 percent by weight and more preferably from about 1 to 10 percent by weight based on the total weight of the modified diorganopolysiloxane and, if present, the unmodified diorganopolysiloxane.

Condensation catalysts suitable for use in both the one-component systems and the two-component systems are metallic carboxylic acid salts and organometallic carboxylic acid salts of manganese, zinc, chromium, iron, cadmium, cobalt, nickel, tin and lead. The tin salts are the preferred condensation catalysts. Examples of such catalysts are dibutyltin dilaurate; dibutyltin diacetate, tin-II octoate, the dibutyltin diester of Versatic Acid (Trade Mark), dibutyltin dioctoate; distannoxanes, such as diacetoxytetrabutyl distannoxane, and diolelyloxytetramethyl distannoxane; ferric octoate, lead octoate, lead laurate, cobalt naphthenate and titanium esters, such as tetrabutyl titanate. Amines and amine salts such as n-hexylamine, n-hexylamine hydrochloride, and n-butylamine hydrochloride can likewise be used as catalysts.

In both the one-component systems and the two-component systems, the condensation catalysts are preferably used in amounts of from about 0.2 to 10 percent by weight based on the total weight of modified diorganopolysiloxanes and, if present, unmodified diorganopolysiloxane.

Cross-linking of the compositions may be accelerated by heating the compositions. Moreover, in the case of compositions which cross-link in the presence of water, cross-linking can be accelerated by using water in addition to that present in the atmosphere.

Agents which are activated in the presence of heat may be employed to effect cross-linking of these compositions. This is so irrespective of whether the modified diorganopolysiloxanes, and, if present, the unmodified diorganopolysiloxanes contain Si-bonded hydroxy groups or hydrolyzable groups, or contain neither hydroxy groups nor hydrolyzable groups.

Suitable cross-linking agents for this purpose are preferably organic peroxy compounds, such as diacyl peroxide, e.g. benzoyl peroxide and bis(dichlorobenzoyl) peroxide; ketoperoxides, e.g. acetone peroxide and cyclohexanone peroxide; hydrocarbon hydroperoxides, e.g. tert-butyl hydroperoxide, cumene hydroperoxide and decahydronaphthalene hydroperoxide; dialkyl peroxides, e.g. di-tert-butyl peroxide and dicumyl peroxide; perketals, e.g. 1,1-di-tert-butylperoxy-3,3,5-trimethyl-cyclohexane; peresters, e.g. tert-butyl perbenzoate, tert-butylperoxyisopropyl carbonate, tert-butyl perpivalate, tert-butyl peroctoate, and tert-butyl permaleinate; and acetylcyclohexanesulphonyl peroxide. Other suitable cross-linking agents effective in the presence of heat are azo compounds in which the two nitrogen atoms of the azo group are bonded to tertiary carbon atoms and the remaining valencies are satisfied by nitrile, carboxy, cycloalkyl or alkyl groups in which the cycloalkyl and alkyl groups preferable contain no more than 18 carbon atoms.

In order to facilitate the distribution of the cross-linking agents and/or condensation catalysts in the compositions, it is preferred that the cross-linking agents and-/or condensation catalysts be dissolved or dispersed in an organic liquid diluent prior to mixing with the other components of the composition. Preferred solvents are organopolysiloxanes free of Si-bonded hydroxy groups, especially trimethylsiloxy-terminated dimethylpolysiloxanes. Other suitable diluents are aliphatic, cycloalphatic and aromatic hydrocarbons and chlorohydrocarbons which are liquid at 20° C/760 mm Hg, such as hexanes, cyclohexane, heptanes, benzene, toluene, xylenes, trichloroethylene and tetrachloroethane; and ethers, such as diethyl ether and dibutyl ether. In the case of diluents other than organopolysiloxanes, it is preferred that the diluent be one that will readily evaporate at room temperature.

The bituminous compositions of this invention can be used for a variety of purposes. For example, they can be shaped and cross-linked to form various shaped bodies for electrical insulation, e.g. cable sheathings and cable terminals, to form seals, to form coatings, for example, roof coverings, water-repellent coatings for concrete and masonry, and finishings for ships. They can be used for impregnating packaging materials, as sealing compositions for electrical devices, e.g. batteries and for filling holes.

Various embodiments of this invention are illustrated in the following examples in which all parts are by weight, unless otherwise specified.

The modified diorganopolysiloxanes employed in the examples were prepared by one of the following two methods:

a. A mixture containing 5.2 parts (50 mole) of styrene, 4.2 parts (33 mole) of n-butyl acrylate, 4.04 parts of a dimethylpolysiloxane having an Si-bonded hydroxy group in each terminal unit and a viscosity of 430 cP at 25° C, 0.8 part of water, and 0.141 part of 1,1-di-tert-butylperoxy-3,3,5-trimethylcyclohexane was introduced into a polymerization vessel. This vessel had an inside diameter of 312 mm and and inside height of 600 mm. It was equipped with an anchor agitator having a width of 295 mm at its widest point, with a gas inlet pipe and a reflux condenser. During agitation, the agitator was driven at 200 revolutions/minute.

The mixture was heated for 7 hours under a nitrogen atmosphere by means of a steam jacket maintained at 100° C. After this time, nitrogen was passed through the mixture at 100°– 130° C to remove unreacted monomers and water and then the mixture was heated for 3 hours at 130° C under a pressure of 12 mm Hg.

The resulting modified diorganopolysiloxane had a viscosity of 45.000 cP at 25° C. Its composition was 30 percent by weight of dimethylpolysiloxane, 31.5 percent by weight of poly-n-butyl acrylate and 38.5 percent by weight of polystyrene.

b. The procedure described under (a) was repeated except for the following variations:
 i. 3.16 parts of styrene
 ii. 5.84 parts of n-butylacrylate
 iii. 6.00 parts of a dimethylpolysiloxane having an Si-bonded hydroxy group in each terminal unit and a viscosity of 800 cP at 25° C, and
 iv. the agitator was operated at 50 revolutions/minute.

The resulting modified diorganopolysiloxane had a viscosity of 65,500 cP at 25° C. Its composition was 40 percent by weight of dimethylpolysiloxane, 39 percent by weight of poly-n-butyl acrylate, and 21 percent by weight of polystyrene.

EXAMPLE 1

About 120 parts of molten bitumen type B 200 (softening point 35°–45° C) were added, with agitation, at a temperature of 200° C, to a mixture containing 60 parts of a dimethylpolysiloxane having an Si-bonded hydroxy group in each terminal unit and a viscosity of 2000 cP at 25° C and 120 parts of the modified diorganopolysiloxane prepared in accordance with the procedure of (a) above, in a one-liter mixing vessel equipped with a high-speed agitator. Agitation was continued until a homogeneous mixture had been formed. The resulting mixture had a viscosity of about 150 000 cP at 25° C.

EXAMPLE 2

The procedure of Example 1 was repeated except that 120 parts of molten BT 15 (a mixture of 85 percent by weight of coal tar and 15 percent by weight of bitumen, obtainable from Chemische Fabrik Weyl AG, Munich, Federal Republic of Germany) was substituted for bitumen type BT 200 and heated at a temperature of 100° C.

EXAMPLE 3

About 60 parts of molten bitumen type B 200 were added, with agitation at a temperature of 200° C, to 240 parts of the modified diorganopolysiloxane prepared in accordance with the procedure of (a) above, in a one-liter mixing vessel equipped with a highspeed agitator. Agitation was continued until a homogeneous mixture was obtained.

EXAMPLE 4

The procedure of Example 3 was repeated except that 240 parts of the modified diorganopolysiloxane prepared in accordance with (b) above was substituted for the modified diorganopolysiloxane prepared in (a) above.

EXAMPLE 5

About 120 parts of molten bitumen type B 200 were added, with agitation at a temperature of 200° C, to a mixture containing 60 parts of a dimethylpolysiloxane having an Si-bonded hydroxy group in each terminal unit and a viscosity of 500 cP at 25° C, 48 parts of the modified diorganopolysiloxane prepared in accordance with (a) above and 72 parts of the modified diorganopolysiloxane prepared in accordance with (b)

above, in a one-liter mixing vessel equipped with a high-speed agitator. Agitation was continued until a homogeneous mixture had been obtained.

EXAMPLE 6

Approximately 100 parts by weight of each mixture prepared in Examples 1 to 5 were each mixed with 3 parts by weight of tetraethyl silicate and 1 part by weight of dibutyltin diversatate. Each mixture was poured into a mould to form a 3 mm thick sample plate. These were allowed to harden at room temperature and were stored for 8 days at 25° C. The various mechanical properties of these plates are illustrated in the Table.

TABLE

| Example | Tensile strength (DIN 53455) (kp/cm²) | Elongation at break (DIN 53455) % | Shore hardness A (DIN 53505) | Tear resistance (ASTM 624 form B) (kp/cm) | Modulus of elasticity (E) (DIN 53457) (kp/cm²) |
|---|---|---|---|---|---|
| 1 | 27 | 330 | 36 | 13 | 5.4 |
| 2 | 23 | 440 | 27 | 9 | 2 |
| 3 | 45 | 260 | 60 | 33 | 10 |
| 4 | 18 | 510 | 20 | 6 | 1.5 |
| 5 | 33 | 370 | 23 | 8 | 2.5 |

COMPARATIVE EXAMPLE

About 120 parts of molten bitumen type B 200 was added, with agitation at a temperature of 200° C, to 180 parts of a dimethylpolysiloxane having an Si-bonded hydroxy group in each terminal unit and a viscosity of 2000 cP at 25° C, in a one-liter mixing vessel equipped with a high-speed agitator. Stirring was continued until a homogeneous mixture had formed. Only ten minutes after cessation of stirring, however, the mixture had started to settle out into two phases with the bitumen forming a hard mass.

Although specific examples of the invention have been described herein, it is not intended to limit the invention solely thereto, but to include all the variations and modifications falling within the spirit and scope of the appended claims.

What is claimed is:

1. A bituminous composition comprising a bituminous material and a modified diorganopolysiloxane in which the diorganopolysiloxane is linked to at least one organic polymer chain and is capable of being cross-linked, said diorganopolysiloxane is present in an amount of from 0.5 to 95 percent by weight based on the total weight of the composition.

2. The composition of claim 1, in which the amount of bituminous material is from 5 to 60 percent by weight based on the total weight of the composition.

3. The composition of claim 1, in which the amount of modified diorganopolysiloxane is from 0.5 to 70 percent by weight based on the total weight of the composition.

4. The composition of claim 1, in which the modified diorganopolysiloxane is linked to organic polymer chains, each having at least 10 carbon atoms.

5. The composition of claim 1, in which the modified diorganopolysiloxane contains from 1 to 95 percent by weight of organic polymer chain(s), each based on the total weight of the modified diorganopolysiloxane.

6. The composition of claim 1, which also contains an unmodified diorganopolysiloxane capable of being cross-linked in an amount up to 70 percent by weight based on the weight of the modified diorganopolysiloxane.

7. The composition of claim 6, wherein the unmodified diorganopolysiloxane is present in an amount up to 50 percent by weight based on the weight of modified diorganopolysiloxane.

8. The composition of claim 1 which also includes a filler.

9. The composition of claim 8 wherein the filler is present in an amount up to 50 percent by weight based on the total weight of the composition.

10. The composition of claim 1 which also includes a pigment.

11. The composition of claim 10 wherein the pigment is present in an amount of from 1 to 30 by weight based on the total weight of the composition.

12. The composition of claim 10 wherein the pigment is present in an amount of from 3 to 10 percent by weight based on the total weight of the composition.

13. The composition of claim 1 which also includes a plasticizer.

14. The composition of claim 13 wherein the plasticizer is present in an amount up to 20 percent by weight based on the total weight of the composition.

15. The composition of claim 1 wherein the modified diorganopolysiloxane is a graft copolymer.

16. The composition of claim 1 wherein the modified diorganopolysiloxane is linked to organic polymer chains consisting of recurring units derived from olefinically unsaturated monomers.

17. The composition of claim 1 wherein the modified diorganopolysiloxane is represented by the general formula

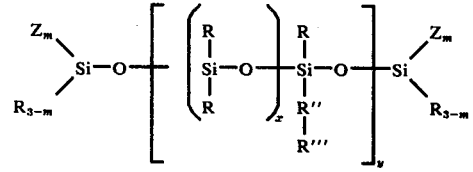

in which R is selected from the group consisting of monovalent hydrocarbon radicals and substituted monovalent hydrocarbon radicals, R'' is selected from the group consisting of divalent hydrocarbon radicals and substituted divalent hydrocarbon radicals, R''' represents a monovalent polymeric organic radical, which is bonded to R'' via a carbon-carbon bond, Z is selected from the group consisting of a hydrolyzable group, and a hydroxy group, $m$ represents 0, 1, 2 or 3, $x$ represents zero or a positive integer, and $y$ represents a positive integer up to 500.

18. The composition of claim 17 wherein R and R'' each have up to 7 carbon atoms.

19. The composition of claim 17 wherein R''' represents an organic polymer radical consisting of recurring units derived from at least one olefinically unsaturated monomer.

20. The composition of claim 17 wherein Z is selected from the group consisting of —OH, —OOCR', —OR, —OR''OR, —NR'$_2$, —ONR'$_2$, —NR'(COR'), ON=CR'$_2$, and —OP(=O)(OR')$_2$ in which R is selected from the group consisting of monovalent hydrocarbon radicals and substituted monovalent hydrocarbon radicals, R' is selected from the group consisting of a hydrogen atom, a monovalent hydrocarbon radical and a substituted monovalent hydrocarbon radical.

21. The composition of claim 17 wherein $m$ is 1.

22. The composition of claim 17 wherein $x$ is an integer up to 20,000.

23. The composition of claim 6 wherein the unmodified diorganopolysiloxane is represented by the general formula

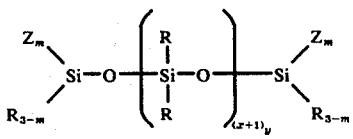

in which R is selected from the group consisting of monovalent hydrocarbon radicals and substituted monovalent hydrocarbon radicals, Z is selected from the group consisting of a hydrolyzable group and a hydroxy group, $m$ represents 0, 1, 2 or 3 and $x$ represents zero or a positive integer and $y$ is a number up to 500.

24. The composition of claim 23 wherein R has up to 7 carbon atoms.

25. The composition of claim 23 wherein Z is selected from the group consisting of —OH, —OOCR', —OR, —OR''OR, —NR'$_2$, —ONR'$_2$, —NR'(COR'), ON=CR'$_2$, and —OP(=O)(OR')$_2$ in which R is selected from the group consisting of monovalent hydrocarbon radicals and substituted monovalent hydrocarbon radicals, R' is selected from the group consisting of a hydrogen atom, a monovalent hydrocarbon radical and a substituted monovalent hydrocarbon radical.

26. The composition of claim 23 wherein $m$ is 1.

27. The composition of claim 23 wherein $x$ is an integer up to 20,000.

28. The composition of claim 1 wherein the modified diorganopolysiloxane contains at least three hydrolyzable groups per molecule.

29. The composition of claim 1 wherein the modified diorganopolysiloxane contains at least two Si-bonded hydroxy groups per molecule, and the composition also includes a cross-linking agent having at least three condensable groups per molecule.

30. The composition of claim 29 wherein the cross-linking agent is a polyfunctional silicon compound which contains at least three groups hydrolyzable by atmospheric moisture per molecule.

31. The composition of claim 29 wherein the cross-linking agent is a silane of the general formula $$R_nSi(OZ')_{4-n}$$

in which R is selected from the group consisting of monovalent hydrocarbon radicals and substituted monovalent hydrocarbon radicals, Z' is selected from the group consisting of monovalent hydrocarbon radicals and oxyhydrocarbon radicals and $n$ represents 0 or 1.

32. The composition of claim 29 wherein the cross-linking agent is a siloxane liquid at room temperature and contains at least three Si-bonded groups selected from the class consisting of hydrogen atoms and groups of the formula —OR' in which R' is selected from the group consisting of hydrogen, monovalent hydrocarbon radicals and substituted monovalent hydrocarbon radicals, and the cross-linking agent is kept separate from the modified diorganopolysiloxane.

33. The composition of claim 29 wherein the cross-linking agent is present in an amount of from 0.5 to 20 percent by weight based on the total weight of the modified diorganopolysiloxane.

34. The composition of claim 29 wherein the cross-linking agent is present in an amount of from 1 to 10 percent by weight based on the total weight of the modified diorganopolysiloxane.

35. The composition of claim 28 which also contains a condensation catalyst selected from the group consisting of metallic salts of carboxylic acids and organometallic salts of carboxylic acids, amines and amine salts, wherein the metals are selected from the group consisting of manganese, zinc, chromium, iron, cadmium, cobalt, nickel, tin and lead.

36. The composition of claim 1 which includes a cross-linking agent that is activated in the presence of heat.

37. The composition as claimed in claim 36 wherein the cross-linking agent is an organic peroxy compound.

38. The cured composition of claim 35.

39. The cured composition of claim 36.

* * * * *

UNITED STATES PATENT AND TRADEMARK OFFICE
CERTIFICATE OF CORRECTION

PATENT NO. : 4,026,853

DATED : May 31, 1977

INVENTOR(S) : Gunter Dressnandt, Hermann Meyer, Walter Keil, Oswin Sommer, Klaus Marquardt, Franz Heinrich Kreuzer, Eckhart Louis and Manfred Wick.

It is certified that error appears in the above–identified patent and that said Letters Patent are hereby corrected as shown below:

Page 1, column 1, under "Inventors", after "Eckhart Louis, Burghausen", insert --- Manfred Wick, Munich ---

Signed and Sealed this

Twenty-second Day of November 1977

[SEAL]

Attest:

RUTH C. MASON
Attesting Officer

LUTRELLE F. PARKER
Acting Commissioner of Patents and Trademarks